United States Patent [19]

Mark et al.

[11] 4,446,298

[45] May 1, 1984

[54] BRANCHED COPOLYCARBONATE FROM TRIPHENOL

[75] Inventors: Victor Mark, Evansville; Charles V. Hedges, Mt. Vernon, both of Ind.

[73] Assignee: General Electric Company, Mt. Vernon, Ind.

[21] Appl. No.: 451,107

[22] Filed: Dec. 17, 1982

[51] Int. Cl.$^3$ ............................................. C08G 63/62
[52] U.S. Cl. ................................... 528/204; 528/196; 528/198; 568/633; 568/719
[58] Field of Search ............................... 528/204, 196

[56] References Cited

U.S. PATENT DOCUMENTS 3,544,514  12/1970  Schnell et al. ...................... 528/204
4,277,600  7/1981  Mark et al. .......................... 528/204

Primary Examiner—Harold D. Anderson
Attorney, Agent, or Firm—Martin B. Barancik

[57] ABSTRACT

Novel triphenolic compounds having utility as branching agents and randomly branched polycarbonates useful for blow molding. The triphenolic compounds are reaction products of phenols and diketones. The triphenols can be unsubstituted, or substituted with alkyl groups, alkoxy groups or halogen radicals, or mixtures thereof.

6 Claims, No Drawings

BRANCHED COPOLYCARBONATE FROM TRIPHENOL

BACKGROUND OF THE INVENTION

This invention relates to novel triphenolic compounds that have utility as branching agents and thermoplastic, randomly branched polycarbonates having excellent resistance to thermal oxidation and excellent blow molding properties and to a process for their preparation.

Polycarbonates are well known, commercially available materials which have achieved wide acceptance in the plastics industry. Such polymers are prepared by reacting a carbonate precursor such as phosgene, for example, with a dihydric phenol such as 2,2-bis (4-hydroxyphenyl) propane, herein referred to as "bisphenol-A," to provide a linear polymer consisting of dihydric phenol derived units bonded to one another through carbonate linkages. Generally speaking, such polymers offer a high resistance to mineral acids, have a high tensile strength and a dimensional stability and impact strength far surpassing that of any other thermoplastic material.

These aromatic polycarbonates differ from most thermoplastic polymers in their melt rheology behavior, in that they, in contrast to most thermoplastic polymers, exhibit Newtonian flow at normal processing temperatures and shear rates below 300 reciprocal seconds.

Most thermoplastic polymers exhibit non-Newtonian flow characteristics over essentially all melt processing conditions. Newtonian flow is the type of flow occurring in a liquid system when the rate of shear is directly proportional to the shearing force, i.e. there is a constant value of viscosity. Non-Newtonian flow occurs when the viscosity varies with shear rate.

Two other characteristics of molten thermoplastic polymers are significant for molding; these are melt elasticity and melt strength. Melt elasticity is the recovery of the elastic energy stored within the melt because of distortion or orientation of the molecules by shearing stresses. Melt strength may be described as the tenacity of a molten strand and also as the ability of the melt to support a stress. Both melt elasticity and melt strength are important properties in extrusion blow molding, particularly in fabrication by extrusion blow molding.

Non-Newtonian flow characteristics tend to impart melt elasticity and melt strength to such polymers, allowing the use thereof in blow molding fabrication. In the usual blow molding operation, a hollow tube of molten thermoplastic is extruded vertically downward at a temperature of about 200°-400° C. A mold then surrounds the tube and gas is introduced into the tube to force it to conform to the shape of the mold. The length of the tube and the quantity of material comprising the tube are limiting factors in determining the ultimate size and wall thickness of the molded part.

The fluidity of the melt obtained from bisphenol-A polycarbonate, the relatively low melt strength and also the paucity of extrudate swelling, serve to limit blow molding applications to relatively small, thin walled parts. Temperatures must also be extremely carefully controlled to prevent the desired length of extruded tube from falling away before the mold can close around it for blowing. Consequently, it will be appreciated that the Newtonian behavior of polycarbonate resin melts has served to restrict severely their use in the production of large hollow bodies by conventional extrusion blow-molding operations as well as in the production of various shapes by profile extrusion methods. Thus, it is desirable to form polycarbonates which provide melts with increased stability during molding at elevated temperature.

Thermoplastic, randomly branched polycarbonates, exhibit unique properties of non-Newtonian flow, melt elasticity and melt strength which provide such stability and permit them to be used in molding operations to obtain such articles as bottles which were not heretofore easily or readily produced with linear polycarbonates. The thermoplastic, randomly branched polycarbonates can be prepared by reacting a polyfunctional compound containing three or more functional groups with a dihydric phenol and a carbonate precursor.

Several prior art disclosures such as exemplified by U.S. Pat. Nos. 2,950,266 and 3,030,335 concerning the addition of a trifunctional additive to polycarbonate forming reactions between dihydric phenols and carbonyl halides teach that if a cross-linked product does not occur as a direct result of the initial polymerization reaction, the final reaction product of the dihydric phenol, the trifunctional compound, and the carbonyl halide would be a heat curable product.

Other prior art attempts have been made to incorporate a polyfunctional compound into polycarbonates of dihydric phenols as exemplified by U.S. Pat. Nos. 3,094,508 and 3,544,514. These have been limited to the preparation of high molecular weight polymers under very limited process conditions. Their preparation requires carefully controlled process conditions which are both cumbersome and expensive. Additional processes are disclosed in U.S. Pat. No. 4,001,184. Other attempts have been made to provide polycarbonate resins which exhibit non-Newtonian melt characteristics as, for example, disclosed in U.S. Pat. No. 3,166,606. However, the polycarbonates there disclosed consist of a physical blend of two or more polycarbonate resins having differing values of reduced viscosity. Moreover, the individual polycarbonate components disclosed by the patentees in the production of such polycarbonate blends are produced entirely from difunctional reactants. Tetraphenolic compounds are obtained from monofunctional phenols and dione precursors in U.S. Pat. No. 4,277,600.

DESCRIPTION OF THE INVENTION

The invention contemplates triphenolic compounds having utility as branching agents for polycarbonates, said compounds being of the formula:

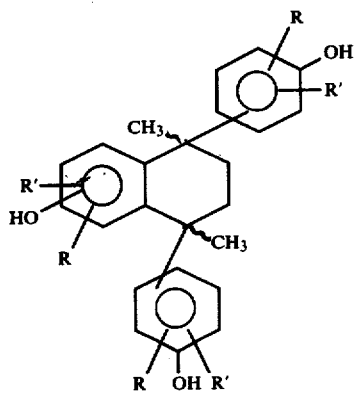

where R and R' are independently selected from hydrogen, $C_1$-$C_5$ alkyl, chloro, bromo or $C_1$-$C_5$ alkoxy.

The new compounds can be prepared by reacting a phenol with acetonylacetone in accordance with the following:

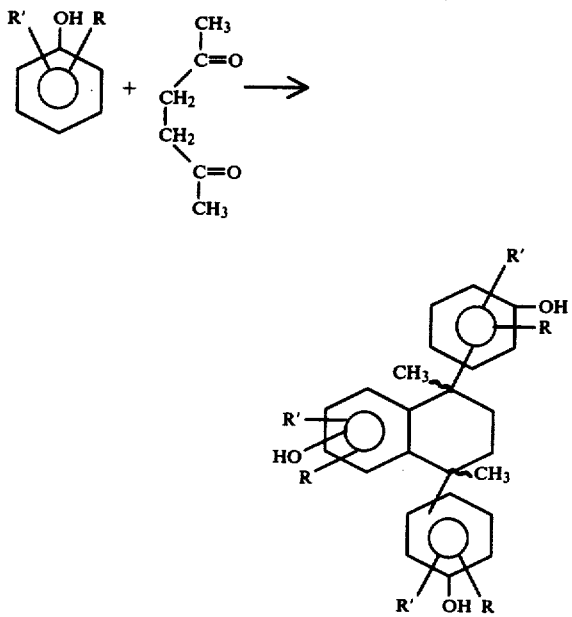

wherein R and R' are as above-defined.

Typical examples of phenolic compounds are phenol, o-cresol, p-cresol, 2,6-xylenol, and the like. Conventional procedures can be used in forming the reaction products of the phenol and acetonylacetone. Merely be way of illustration, the phenolic compound in excess of the stoichiometric amount is mixed with 2,5-hexanedione (acetonylacetone) and a protic acid, e.g., hydrochloric acid, methanesulfonic acid, etc., is added to the mixture. The mixture is maintained at a moderately elevated temperature, e.g. between 40° C. and 80° C. and occasionally a co-catalyst may be added, e.g., mercaptoacetic acid. Progress of the reaction can be monitored by chromatographic or spectroscopic methods, e.g. infrared (IR) spectroscopy and observing the diminution or disappearance of the carbonyl band, or the appearance of characteristic triphenolic peaks in gas chromatograms. In any event, the triphenolic residue is a solid and can be separated by conventional means from the unreacted liquid mixtures.

The bromine and chlorine groups R and R' can be introduced subsequently, if desired, by halogenation. Methylene chloride, chloroform, acetic acid, water, other nonreactive liquids and aqueous sodium hydroxide solution may be used as solvents or dispersants. The degree of halogenation can readily be followed by gas or liquid chromatography, IR or proton NMR.

The triphenolic moieties of the novel triphenolic compounds may be substituted in like manner or they may be "mixed", i.e., one or more of these moieties may have different substituents if corresponding mixed starting materials are used.

Purification of the triphenolic compounds can be carried out by recrystallization, elution chromatography, or other methods known to those skilled in the art. Preferred solvents of recrystallization are methylene chloride, benzene, cyclohexane, methanol, ethanol and alcohol water mixtures. Elution chromatography is carried out best over alumina or silica, using a variety of solvents as eluants.

It is readily apparent that the modes in which the triphenolic compounds are synthesized may result in isomeric mixtures due to the fact that phenolic compounds are capable of reacting preferably at the carbon that is ortho or para to the phenolic hydroxyl group. The halogenated phenolic compounds may also be present as mixtures if an isomeric mixture of phenolic compounds is used as a starting material. A mixture of isomers also results from the halogenation of even a pure phenolic isomer.

The triphenols of the instant invention may be used to make novel branched aromatic polycarbonates having an IV of about 0.3 to 1.0 dl/g as measured in methylene chloride at 25° C. These branched polycarbonates are substantially free of crosslinking.

In the preparation of the novel thermoplastic, randomly branched polycarbonates of this invention, the amount of triphenolic compound which is reacted with the dihydric phenol and the carbonate precursor is critical to the extent that the amount employed must be sufficient to produce a true thermoplastic, randomly branched polycarbonate which is substantially free of crosslinking. If an amount of compound employed is less than 0.01 mole percent, based upon the moles of the dihydric phenol employed, the resulting polymer will not exhibit the degree of non-Newtonian melt characteristics desired for blow molding and/or melt extrusion purposes. Preferably, it is desirable to employ 0.01 to about 3.0 and more particularly, 0.01–1.0 mole percent of the phenolic compound, based upon the total moles, of dihydric phenol.

The dihydric phenols that can be employed in the practice of this invention include bis(4-hydroxyphenyl)methane, 1,1-bis(4-hydroxyphenyl)ethane, 2,2-bis(4-hydroxyphenyl)propane, also called bisphenol-A or BPA, 2,2-bis(4-hydroxy-3-methylphenyl)propane, 3,3-bis(4-hydroxyphenyl)pentane, 2,2-bis(4-hydroxy-3-chlorophenyl)propane, 2,2-bis(4-hydroxy-3,5-dibromophenyl)propane, 1,1-bis(4-hydroxyphenyl)cyclohexane, p,p'-dihydroxydiphenyl, 3,3'-dichloro-4,4'-dihydroxydiphenyl, bis(4-hydroxyphenyl)ether, bis(4-hydroxyphenyl) sulfone, bis(3,5-dimethyl-4-hydroxyphenyl)sulfone, resorcinol, hydroquinone; 1,4-hydroxy-2,5-dichlorobenzene, 1,4-dihydroxy-3-methylbenzene, bis(4-hydroxyphenyl)sulfoxide, bis(4-hydroxyphenyl)sulfide, bis(3,5-dimethyl-4-hydroxyphenyl)sulfoxide, and the like. A variety of additional dihydric phenols can also be employed such as are disclosed in U.S. Pat. Nos. 2,999,835; 3,028,365 and 3,153,008. It is, of course, possible to employ two or more different dihydric phenols or a copolymer of a dihydric phenol with glycol or with hydroxy or acid terminated polyester, or with one or more dibasic acids in the event a polycarbonate copolymer or copolyestercarbonate rather than a homopolymer is desired for use in the preparation of the branched polymers of this invention. The preferred dihydric phenol is bisphenol-A.

The carbonate precursor employed can be either a carbonyl halide, a haloformate or a diaryl carbonate. Thus the carbonyl halides can be carbonyl chloride, carbonyl bromide, and mixtures thereof. The haloformates suitable for use include mono- or bishaloformates of dihydric phenols (bischloroformates of hydroquinone, monochloroformate of bisphenol-A, etc.) or bishaloformates of glycols (bishaloformates of ethylene glycol, neopentyl glycol, polyethylene glycol, etc.). When using bishaloformates, equimolar amounts of free dihydric phenols are required to effect polymerization. When polymerizing monohaloformates of diphenols no free diphenol is required. While other carbonate precursors will occur to those skilled in the art, carbonyl chloride, also known as phosgene is preferred.

The polymerization of dihydric phenols to high molecular weight polycarbonates may be carried out by any conventional method known in the art. For example, phosgene can be introduced into a solution of the diphenol in organic bases, such as pyridine, triethylamine, dimethylaniline or into solutions of the diphenol in suitable organic solvents, such as benzene, toluene, chlorobenzene, methylene chloride, carbon tetrachloride and the like, with the addition of acid binding agents.

In the most widely practiced polymerization process phosgene is introduced into an aqueous solution or slurry of the alkali metal salt of the diphenol in the presence of methylene chloride and a phase-transfer catalyst as well as a molecular weight regulator, usually a monofunctional phenol. One advantage of the instant invention is that the phenolic branching agent has the same reactivity profile as the diphenol used to make the linear chains, hence it can be added, in the desired amount, not only later but together with the diphenol at the beginning of the polymerization process. In other words, the phenolic compounds can be formulated directly into the reaction mixture to be polymerized to branched polycarbonates.

The reaction between the halogen containing carbonate precursor, the dihydric phenol and the triphenolic branching agent, when carried out by the interfacial method in accordance with this invention, is conducted in the presence of an inert organic solvent which is essentially immiscible with water and does not deleteriously affect the formed polymer. Examples of suitable organic solvents are methylene chloride, ethylene dichloride and chlorobenzene.

The novel phenols of the instant invention are capable of forming stable aqueous solutions in the form of their alkali salts.

In a preferred variant of the polymerization process, the novel triphenolic branching agent is added in the form of an aqueous solution of its alkali metal salt.

The novel branching agent may also be formulated into the reaction mixture of the dihydric phenol to be polymerized in finely divided solid form or as a methylene chloride solution or slurry. In either form it is copolymerized readily in the polymerization forming process and becomes a fully incorporated segment.

The alkali metal hydroxide which can be employed in the polymerization process can be any of the alkali metal hydroxides selected from the groups consisting of the alkali group and the alkaline earth groups. Specifically, these include potassium hydroxide, sodium hydroxide, lithium hydroxide, calcium hydroxide, magnesium hydroxide and the like.

The interfacial, or phase transfer catalysts, which can be employed in the polymerization process can be any of the suitable catalysts that aid the polymerization of dihydric phenols with phosgene. Suitable catalysts include tertiary amines such as triethylamine, tripropylamine, N,N-dimethylaniline and ethylammonium chloride, cetyl triethyl ammonium bromide, tetra-n-heptylammonium iodide, tetra-n-propyl ammonium chloride, tetramethylammonium chloride, tetramethylammonium hydroxide, tetra-n-butylammonium iodide, benzyltrimethylammonium chloride and the like; and quaternary phosphonium compounds such as n-butyltriphenyl phosphonium bromide and tetrabutyl phosphonium chloride and the like.

The molecular weight regulators which can be employed in the interfacial process include monohydric phenols such as phenol, chroman-I [4-(2,4,4-trimethylchromanyl)phenyl], p-t-butyl phenol, p-cumyl phenol, and the like. Preferably, phenol or p-tert-butyl phenol are employed as the molecular weight regulator. An effective amount of a molecular weight regulator that will give modified melt flow value (KI) of 1,000 to 50,000 centiseconds, preferably from 5,000 to 30,000 centiseconds may be used. Generally, it is preferred to use from 2–5 mol%, and more preferably from 2.5–4.5 mol% phenols such as phenol, chroman-I [4,(2,4,4-trimethyl-chromanyl)phenol], p-t-butyl phenol, p-cumyl phenol, and the like. Preferably, phenol or p-tert-butyl phenol are employed as the molecular weight regulator. An effective amount of a molecular weight regulator that will give modified melt flow value (KI) of 1,000 to 50,000 centiseconds, preferably from 5,000 to 30,000 centiseconds may be used. Generally, it is preferred to use from 2–5 mol%, and more preferably from 2.5–4.5 mol% of phenol as the molecular weight regulator.

It is sometimes desirable to introduce reducing agents, such as sodium dithionite into the aqueous system in order to suppress the formation of colored contaminants.

The aqueous interfacial polymerization method may be carried out at temperatures from ambient to about 50° C. However, higher temperatures are within the scope of this invention since the instant method is not temperature dependent.

The novel phenol mixture can be converted into branched polycarbonates also by esterification with dialkyl, alkylaryl or diaryl carbonates at elevated temperatures from about 50° C. to about 325° C., at atmospheric or at reduced pressure, in neat form, or in the presence of neutral diluents or in the presence of transesterification catalysts, such as metal oxides, hydroxides, carbonates and the like, as known in the art. When using aryl carbonates, phenols are generated in the transesterification process, so that no molecular weight regulators need be added to the reaction mixture. In fact the degree of polymerization is controlled by the extent of removal of the monohydroxylic coproducts, such as alcohols or phenols.

The branched polycarbonates, when produced according to the instant invention by the interfacial polymerization technique, were recovered from the washed, neutral methylene chloride phase by steam precipitation and drying and were fed into an extruder operating at 265° C. and the extrudates were comminuted into pellets. When prepared by the transesterification method, the polycarbonate melt was directly converted into extrudate and pellets.

The branched polycarbonates produced according to the instant invention are soluble in selected organic solvents and can be worked into shaped articles from solutions, such as into films. Being thermoplastic, these branched polycarbonates can be easily fabricated by conventional shaping methods from melt, such as by extrusion molding, blow-molding, lamination and the like.

The branched polycarbonates of the invention may be combined with other polycarbonates or with thermoplastic polyesters such as polyethylene terephthalate or poly (1,4-butylene terephthalate). In addition, these branched polycarbonates may be combined with reinforcing fillers such as filamentous glass or with non-reinforcing fillers, mold release agents, impact modifiers, extrusion aids, light stabilizers, flame retardants, foaming agents, such as those disclosed in U.S. Pat. No. 4,263,409 and Ger. Offen. 2,400,086 which are incorporated by reference, and the like if desired.

DESCRIPTION OF THE PREFERRED EMBODIMENTS

The following examples are set forth to illustrate the invention and are not to be construed to limit the scope of the invention.

EXAMPLE 1

Preparation of a mixture of cis-1,4-dimethyl-1,4-bis(4-hydroxy-3-methylphenyl)-6-hydroxy-7-methyl-1,2,3,4-tetra-hydronapthalene and trans-1,4-dimethyl-1,4-bis(4-hydroxy-3-methylphenyl)-6-hydroxy-7-methyl-1,2,3,4-tetra-hydronapthalene (I), from o-cresol and 2,5-hexanedione.

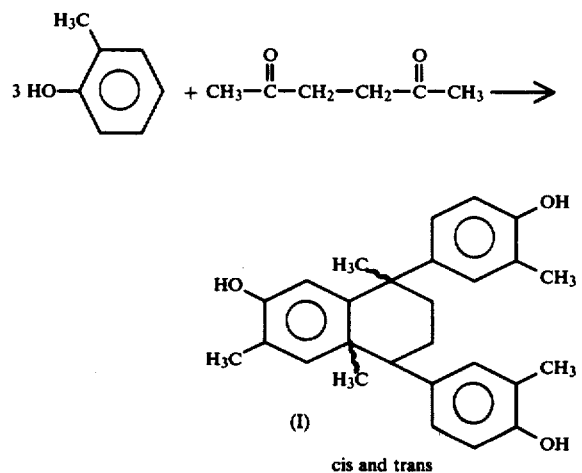

cis and trans

Into a reaction mixture, consisting of 216.2 g (2.0 mole) of molten o-cresol and 1 ml. of mercaptoacetic acid, placed in a three-neck flask, equipped with stirrer, thermometer, reflux condenser an addition funnel with provision for sub-surface addition and a sub-surface gas inlet tube, was introduced anhydrous hydrogen chloride gas at 40° C. until saturation was obtained. Then 11.4 g (0.1 mole) of 2,5-hexanedione was added dropwise to the well stirred reaction mixture while maintaining the temperature between 40° and 53° C. and a slow hydrogen chloride flow. The addition of the diketone was completed in about 20 minutes, and sampling of the reaction mixture was started for gas chdomatographic analyses. Early samples, taken after 2 to 3 hours, indicated the formation of the novel bisphenol 5,5-bis(4-hydroxy-3-methylphenyl)-2-hexanone (II) by the presence of a major peak with an emergence time of 22.06 minutes, relative to p-cumylphenol, which emerged at 14.89 minutes.

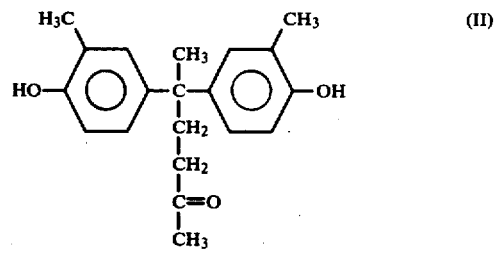

To react it further and to convert this diphenol to the triphenols (I) the temperature of the reaction mixture was raised to 70° C. while maintaining a slow but steady hydrogen chloride flow (about one bubble per 5 seconds). Samples of the reation mixture taken at 3 hour intervals indicated the gradual disappearance of the ketodiphenol and the formation, in nearly equal proportions, of the cis and trans isomeric triphenols. After 9 hours of reaction time the ketodiphenol completely disappeared, and the cis/trans mixture of triphenols reached maximum concentration. Excess o-cresol was stripped off in water-aspirator vacuum and the reddish-brown, solid residue, which weighed 37.1 g or 92.2% of the theory, was dissolved in methylenechloride, washed several times with water, dried and evaporated to yield a purified version of the crude reaction product, consisting in nearly equal amounts, of the stereoisomeric triphenols—as shown by their gas chromatographic emergence times of 27.36 and 27.91 minutes relative to the 14.9 minute for the reference p-cumylphenol.

EXAMPLE 2

Preparation of the stereomer of 1,4-dimethyl-1,4-bis(4-hydroxy-3-methylphenyl)-6-hydroxy-7-methyl-1,2,3,4-tetra-hydronaphthalene (I) with the shorter gc retention time.

A portion (17.5 g) of the cis and trans mixture of triphenols, obtained in Example 1, was dissolved in 125 ml. of methylenechloride and the solution poured into an elution chromatography column (1 inch diameter, 28 inches long), filled with neutral alumina. Fresh methylene chloride was then added and used as eluant. Several cuts were taken of the eluant and were analyzed by gas chromatography, which indicated that the steroisomer with the shorter gc retention time was preferentially eluted. Evaporation of the solvent and recrystallization from cyclohexane of the elution chromatography cuts, rich in the stereomer above, yielded white crystals with a melting point of 219°–221° C.

Proton and carbon nuclear magnetic resonance confirmed structure I for the novel trisphenol. Thus the proton NMR spectrum run in deuteriated acetone showed the resonances (δ) assigned to the structure:

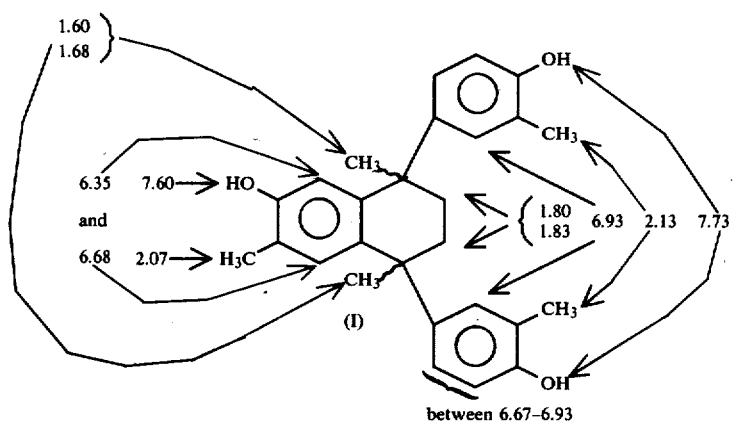

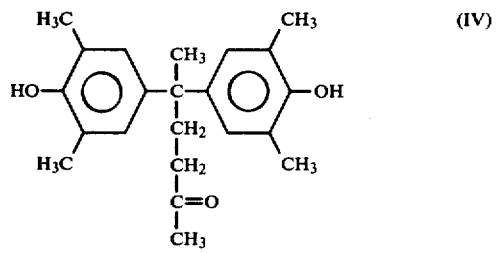

All peak areas were in the correct proportions corresponding to the number of hydrogens present.

Carbon-13 nuclear magnetic resonance also confirmed the structure of I by displaying eight of the nine sp³ carbon peaks (the methyls on the two cresol moieties were shown to be equivalent) and sixteen of the eighteen sp² carbon peaks, again the distant carbon peaks being equivalent.

EXAMPLE 3

Preparation of cis and trans 1,4-dimethyl-1,4-bis(4-hydroxy-3,5-dimethylphenyl)-6-hydroxy-5,7-dimethyl-1,2,3,4-tetra-hydronaphthalene (III) from 2,6-xylenol and 2,5-hexanedione.

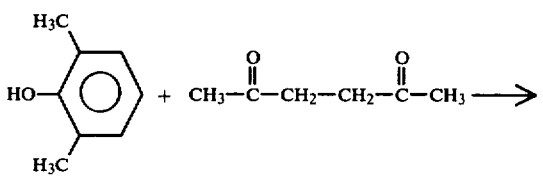

The procedure of Example 1 was exactly repeated, except that o-cresol was replaced with 244.2 g (2.0 mole) of 2,6-xylenol. Halfway through the reaction the formation of the intermediate novel bisphenol 5,5-bis(4-hydroxy-3,5-dimethylphenyl)-2-hexanone (IV):

was indicated by its gas chromatography emergence peak at 24.85 minutes, relative to 15.46 minutes of the reference p-cumylphenol.

To convert it to the stereomeric triphenols, the reaction temperature was raised to 70°, while continuing with the introduction of hydrogen chloride. Gradually the characteristic doublet of the cis and trans triphenols appeared in the gas chromatography tracing of the reaction mixture at 30.79 and 31.12 minutes, while the relative percentage of the bisphenol decreased. In contradistinction to the o-cresol case described in Example 1, there was also a fair amount of the derivative tetraphenol produced, 2,2,5,5-tetrakis(4-hydroxy-3,5-dimethylphenyl)hexane (V) which had an emergence time of 36.36 minutes.

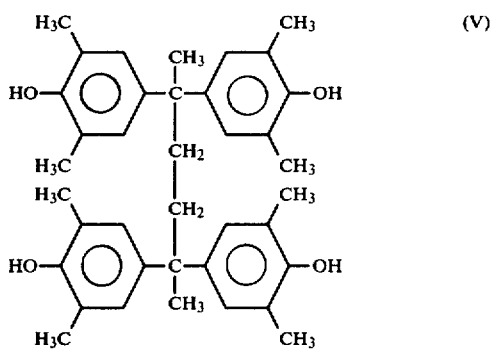

When the diphenol intermediate was consumed and the level of the tri- and tetraphenols remained constant, the excess xylenol was removed by distillation in water aspirator vacuum, yielding as residue a mixture of the stereomeric triphenols and the tetraphenol.

Separation of the isomeric triphenols from the tetraphenol was carried out based on the higher solubility of the former in organic solvents such as aqueous methanol or acetonitrile, in which the tetraphenol is rather insoluble. The triphenols III thus accumulate in the mother liquors of the extraction or recrystallization processes and can be isolated as crystalline residues, suitable for use as branching agents.

EXAMPLE 4

Preparation of cis and trans 1,4-dimethyl-1,4-bis(4-hydroxyphenyl)-6-hydroxy-1,2,3,4-tetrahydronaphthalene (VI) from phenol and 2,5-hexanedione.

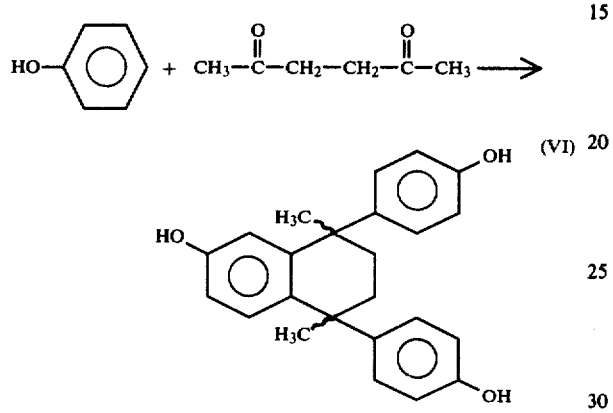

The procedure of Example 1 was repeated, except that 22.8 g (0.2 mole) of 2,5-hexanedione was employed and the o-cresol was replaced with 188.2 g (2.0 moles) of phenol. The progress of the reaction was followed by gas chromatography, which indicated that, in addition to the title compounds, there were formed also the following sister products: cis- and trans-1,4-dimethyl-1-(4-hydroxyphenyl)-4-(2-hydroxyphenyl)-6-hydroxy-1,2,3,4-tetrahydronaphthalene (VII), cis and trans-1,4-dimethyl-1-(2-hydroxyphenyl)-4-(4-hydroxyphenyl)-6-hydroxy-1,2,3,4-tetrahydronaphthalene (VIII) and cis- and trans-1,4-dimethyl-1,4-bis(4-hydroxyphenyl)-5-hydroxy-1,2,3,4-tetrahydronaphthalene (IX), as the major components of the reaction mixture.

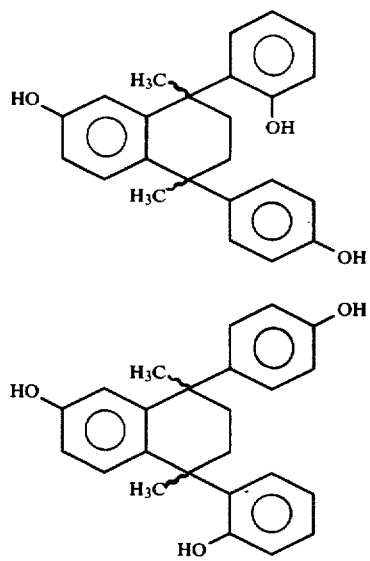

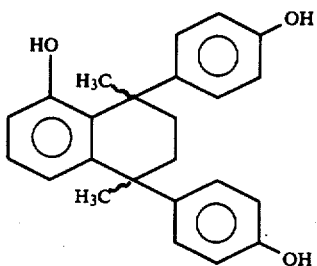

In addition, there was also formed a tetraphenol, 2,2,5,5-tetrakis(4-hydroxyphenyl)hexane, (X), in varying proportions, depending on reaction conditions, which, however, could readily be separated from the triphenols due to its lesser solubility in organic solvents, such as acetone, methanol or water-methanol mixtures.

EXAMPLE 5

Preparation of cis and trans-1,4-dimethyl-1,4-bis(2-hydroxy-5-methylphenyl)-8-hydroxy-5-methyl-1,2,3,4-tetrahydronaphthalene (XI), from p-cresol and 2,5-hexanedione.

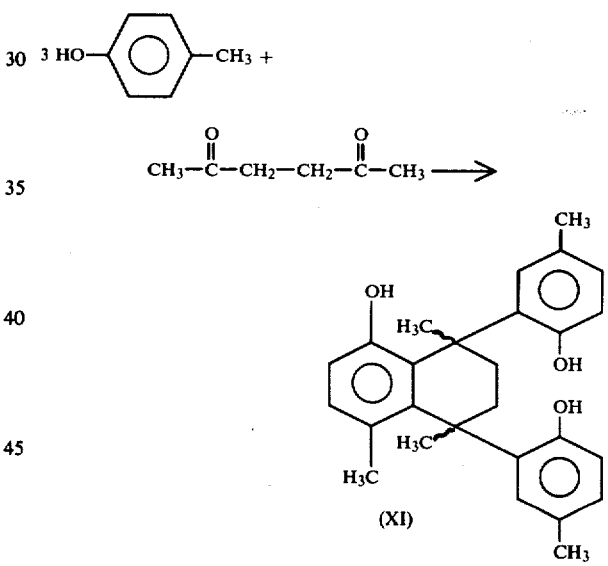

When the procedure of Example 1 was exactly repeated except that the o-cresol was replaced with an equal amount of p-cresol, the resultant reaction mixture contained the triphenol compound (XI) having the gas chromatography emergence times of 23.59 and 23.90 minutes, relative to 13.34 minutes for the reference, p-cumylphenol.

EXAMPLE 6

Preparation of a branched polycarbonate with the cis and trans triphenol (I) of Example 1.

To a well stirred mixture of 57.1 g (0.25 mole) of 2,2-bis(4-hydroxyphenyl)propane, (BPA), 0.75 g (3 mole %) of phenol, 0.7 ml. (2 mole %) of triethylamine, 400 ml. of methylenechloride, 300 ml. of water and enough 45% aqueous sodium hydroxide solution to maintain a pH of 11.5, there was added a clear solution of 0.45 g (0.45 mole %) of an equimolar mixture of cisand trans-1,4-dimetyl-1,4-bis(4-hydroxy-3-methylphenyl)-6-hydroxy-7-methyl-1,2,3,4-tetrahydronaphthalene (I) in 10 ml. of 10% aqueous sodium hydroxide solution. The introduction of phosgene into the well stirred reaction mixture was carried out at a rate of 1 g/minute for 31 minutes, continuously adjusting the pH of the mixture to remain between 11.0 and 11.8, until the BPA content of the aqueous phase was reduced to below 10 parts per million.

The recovered branched polycarbonate from the washed, neutral methylenechloride phase by precipitation with methanol and drying, had the following properties: intrinsic viscosity 0.568 dl/g; K.I. 12,900 csec; MIR 1.87.

EXAMPLE 7

Preparation of a branched polycarbonate with the triphenol of Example 2.

If the procedure of Example 6 is exactly repeated, with the triphenol (I) of Example 1 replaced by 0.45 mole % of an equimolar mixture of the cis and trans triphenol (I) with the shorter gc retention time of Example 2, branched polymer can be recovered from the washed, neutral methylene chloride phase by precipitation with methanol and drying.

EXAMPLE 8

Preparation of a branched polycarbonate with the triphenol of Example 3.

If the procedure of Example 6 is exactly repeated, with the triphenol of Example 1 replaced by 0.45 mole % of an equimolar mixture of the cis and trans triphenol III of Example 3, branched polymer can be recovered from the washed, neutral methylene chloride phase by precipitation with methanol and drying.

EXAMPLE 9

Preparation of a branched polycarbonate with the triphenol VI of Example 4.

If the procedure of Example 6 is exactly repeated, with the triphenol (I) of Example 1 replaced by 0.45 mole % of an equimolar mixture of the cis and trans triphenol VI of Example 4, branched polymer can be recovered from the washed, neutral methylene chloride phase by precipitation with methanol and drying.

EXAMPLE 10

Preparation of a branched polycarbonate with the triphenol (XI) of Example 5.

If the procedure of Example 6 is exactly repeated, with the triphenol (I) of Example 1 replaced by 0.45 mole % of an equimolar mixture of the cis and trans triphenol (XI) of Example 5, branched polymer can be recovered from the washed, neutral methylene chloride phase by precipitation with methanol and drying.

EXAMPLES 11–14

If the procedure of Example 1 is repeated, substituting the following phenols:

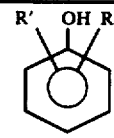

| Example | R | R' |
|---|---|---|
| 11 | 2-$CH_3CH_2$— | 6-$CH_3CH_2$— |
| 12 | 2-$CH_3O$— | 6-$CH_3O$— |
| 13 | 2-$CH_3$— | 3-$CH_3O$— |
| 14 | 2-Cl— | 6-H— | there will be obtained triphenols which are substituted 2,3-dihydro-6-hydroxy naphthalenes of the formulae:

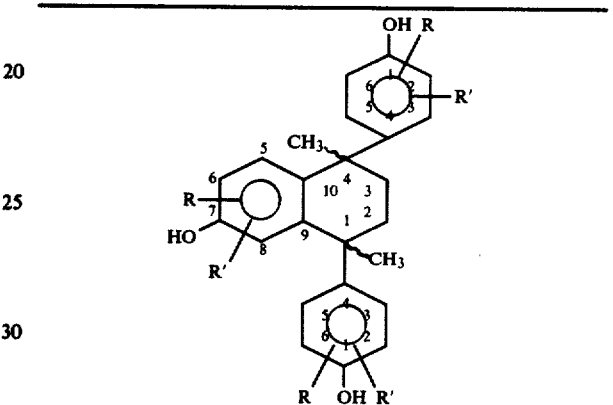

| Example | R | R' |
|---|---|---|
| 11 | 6,6',6"-$CH_3CH_2$— | 8,2',2"-$CH_3CH_2$— |
| 12 | 6,6',6"-$CH_3O$— | 8,2',2"-$CH_3O$— |
| 13 | 6,6',6"-$CH_3$— | 8,2',2"-$CH_3O$— |
| 14 | 7,2',2"-Cl— | |

EXAMPLES 15–16

If the cis/trans triphenol compound (VI) of Example 4 is dissolved 25% aqueous sodium hydroxide solution and chlorine gas is introduced while maintaining the temperature near ambient with cooling, until one mole equivalent of chlorine is introduced, there will be obtained a statistical mixture of positional isomers comprising unchlorinated, monochlorinated and some dichlorinated (VI). After the chlorination, dilute hydrochloric acid is added to the reaction mixture until neutral and the precipitated chlorinated triphenols are separated by filtration and dried. If the triphenol (I) of Example 1 is substituted and if bromine is added instead of chlorine, there will be obtained the corresponding statistical mixture of positional isomers comprising unbrominated, brominated and some dibrominated (I).

EXAMPLES 17–22

If each of the triphenols of Examples 11–16 are substituted, respectively, for the triphenol of Example 1 in the procedure of Example 6, a polycarbonate branched with the corresponding triphenol of the Examples will be obtained in accordance with this invention.

The above-mentioned patents and publications are incorporated herein by reference.

Other variations are possible in light of the above teachings. It is, therefore, to be understood that changes may be made in the particular embodiment of the invention described which are within the full intended scope of the invention as defined by the appended claims.

We claim:

1. A high molecular weight, thermoplastic, randomly branched polycarbonate of an aromatic dihydric phenol a carbonate precursor and a chain branching component, said randomly branched polycarbonate having an intrinsic viscosity of 0.30 to 1.0 dl/g in methylene chloride at 25° C. wherein the branching component comprises one or more compounds of the formula

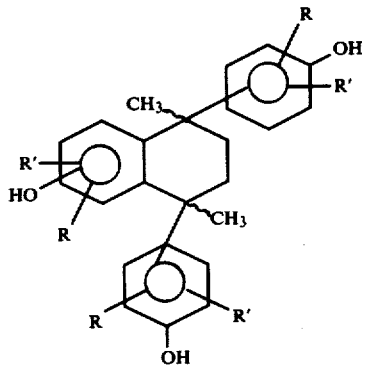

where R and R' are independently selected from hydrogen, $C_1$–$C_5$ alkyl, chloro, bromo or $C_1$–$C_5$ alkoxy.

2. A high molecular weight, thermoplastic, randomly branched polycarbonate as defined in claim 1 wherein in the branching component is a mixture of cis-1,4-dimethyl-1,4-bis(4-hydroxy-3-methylphenyl)-6-hydroxy-7-methyl-1,2,3,4-tetrahydronaphthalene and trans-1,4-dimethyl-1,4-bis(4-hydroxy-3-methylphenyl)-6-hydroxy-7-methyl-1,2,3,4-tetrahydronaphthalene.

3. A high molecular weight, thermoplastic, randomly branched polycarbonate as defined in claim 1 wherein the branching component is a stereomer of 1,4-dimethyl-1,4-bis(4-hydroxy-3-methylphenyl)-6-hydroxy-7-methyl-1,2,3,4-ttrahydronaphthalene.

4. A high molecular weight, thermoplastic, randomly branched polycarbonate as defined in claim 1 wherein the branching component is a mixture of cis-1,4-dimethyl-1,4-bis-(4-hydroxy-3,5-dimethylphenyl)-6-hydroxy-5,7-dimethyl-1,2,3,4-tetrahydronaphthalene and trans-1,4-dimethyl-1,4-bis-(4-hydroxy-3,5-dimethylphenyl)-6-hydroxy-5,7-dimethyl-1,2,3,4-tetrahydronaphthalene.

5. A high molecular weight, thermoplastic, randomly branched polycarbonate as defined in claim 1 wherein the branching component is a mixture of cis-1,4-dimethyl-1,4-bis(4-hydroxyphenyl)-6-hydroxy-1,2,3,4-tetrahydronaphthalene and trans-1,4-dimethyl-1,4-bis(4-hydroxyphenyl)-6-hydroxy-1,2,3,4-tetrahydronaphthalene.

6. A high molecular weight, thermoplastic, randomly branched polycarbonate as defined in claim 1 wherein the branching component is a mixture of cis-1,4-dimethyl-1,4-bis-(2-hydroxy-5-methylphenyl)-8-hydroxy-5-methyl-1,2,3,4-tetrahydronaphthalene and trans-1,4-dimethyl-1,4-bis-(2-hydroxy-5-methylphenyl)-8-hydroxy-5-methyl-1,2,3,4-tetrahydronaphthalene.

* * * * *